Feb. 5, 1935.  T. G. MYERS  1,990,305

AUTOMATIC OILER

Filed Oct. 27, 1930   2 Sheets-Sheet 1

Inventor
Thomas G. Myers
by John Flam
Attorney

Feb. 5, 1935.  T. G. MYERS  1,990,305
AUTOMATIC OILER
Filed Oct. 27, 1930  2 Sheets-Sheet 2
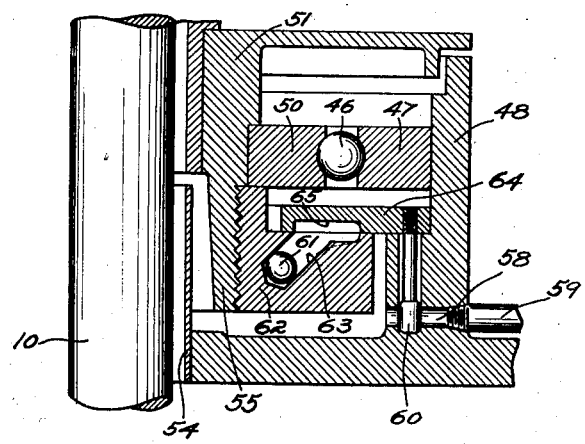
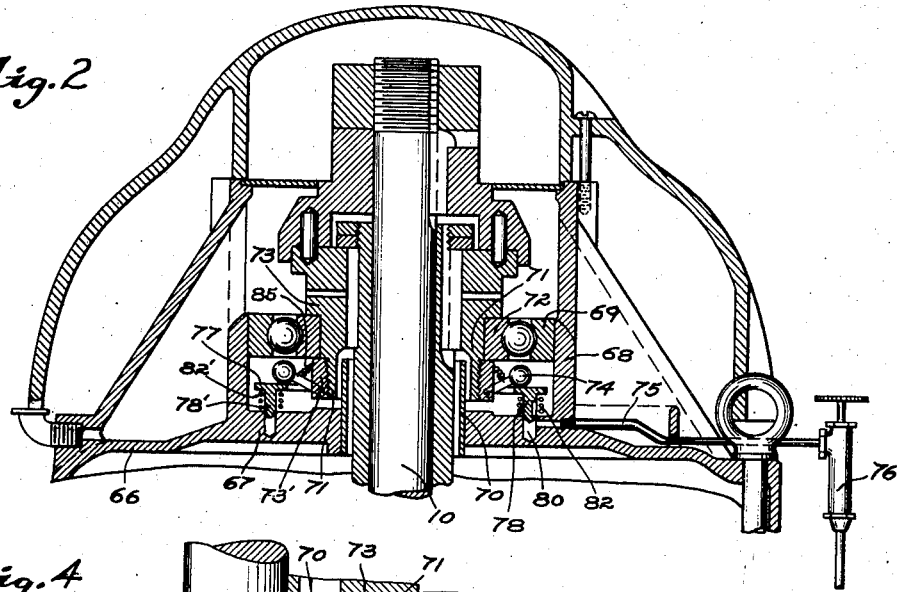
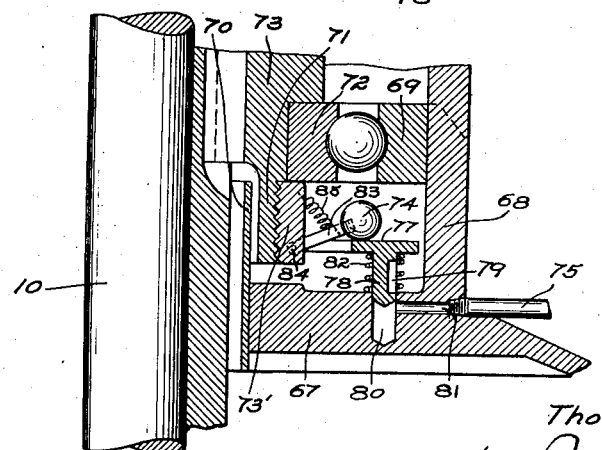
Inventor
Thomas G. Myers
by John Flam
Attorney Patented Feb. 5, 1935

1,990,305

UNITED STATES PATENT OFFICE 1,990,305

AUTOMATIC OILER

Thomas G. Myers, Los Angeles, Calif., assignor to U. S. Electrical Manufacturing Company, Los Angeles, Calif., a corporation of California Application October 27, 1930, Serial No. 491,548

21 Claims. (Cl. 308—170)

This invention relates to an automatic device for constantly lubricating the long vertical shaft that operates a pump in deep wells, and more particularly relates to modifications of the devices disclosed in my first filed application Serial No. 458,970, filed June 2, 1930, and the application to Frank Mason, Serial No. 473,074 filed August 4, 1930.

In the above mentioned applications, various devices are described for automatically lubricating the bearings on the pump shafts of deep well pumps. The shafts are now quite generally rotated by means of a source of motion secured to the pump shafts at the top of the well. Such source of motion comprises, in general, a vertical motor which is provided with reservoirs for oil for the motor shaft, said reservoirs being positioned at the top and bottom of the motor about the main bearings thereof. As described in the above mentioned applications, oil is continuously passed to the bearings of the pump shafts while the pumps are in operation, without the interposition of manual aid. This is accomplished, in one instance, by means of a ball valve resting on a valve seat, which is caused to flutter by virtue of the swirling oil in the oil reservoirs, and thus permit oil to flow through a conduit leading to the bearings on the shaft. In the other instance, oil is passed to the bearings by means of a centrifugal action, and a simple lever arrangement, which by virtue of the swirling oil, causes an unseating of a valve to permit the flow of oil to the bearings. In both instances, the oil within the reservoirs is swirled about by means of the rotation of the pump shaft.

It is an object of this invention to provide a novel means for assuring a continuous supply of oil to the bearings on the pump shaft, while the pump is in operation. This is accomplished by means of a member which is caused to rotate in response to the rotation of the pump shaft, and by means of the centrifugal force set up by the rotation of the member, a pressure is exerted on a valve closure which causes it to establish communication between the reservoir and a conduit leading to the bearings.

It is a further object of this invention to so arrange the above mentioned device that the supply of oil to the bearings on the shafts, takes place without the interposition of manual aid, and only when the pumps are in operation.

It is a further object of this invention to provide a device simple in design and construction, and inexpensive to manufacture.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 2 is a fragmentary sectional view of a modified embodiment of my invention;

Fig. 3 is a fragmentary enlarged detailed view of a portion of the structure shown in Fig. 1; and Fig. 4 is a fragmentary enlarged detailed view of a portion of the structure shown in Fig. 2.

Figure 1:
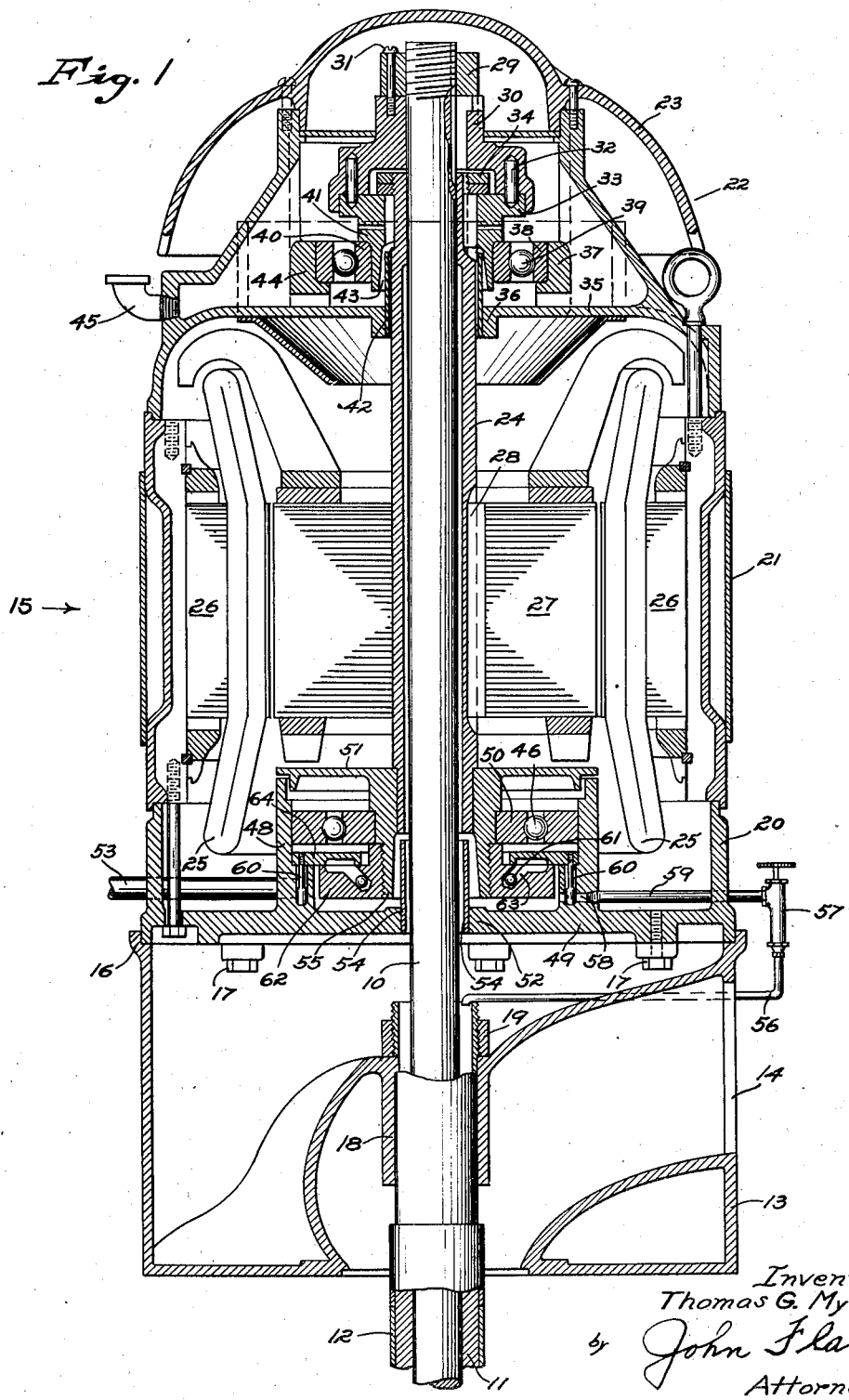
Figure 1 is a sectional view of a pump head and an electric motor embodying my invention.

In Fig. 1 there is shown a rotatable shaft 10 which extends downwardly into an earth bore and is guided by a series of bearing bushings 11, secured to the inside of a pipe casing 12. Only a part of the bushing 11 is shown, but it is to be understood that there are a number of such bushings spaced axially throughout the length of the depending casing 12. A pump head structure 13 and a discharge opening 14 is provided for the passage through and egress of the liquid pumped from the bore.

The pump head structure 13 can conveniently serve to support a vertical motor structure 15 as by a flange 16 and bolts 17 passing through a portion of the flange and threaded into the lower end of the motor structure 15. It can also support the casing 12, as by the aid of a hub 18, and a collar or nut 19 threaded to the top of the casing 12.

This invention is not limited to any details of construction of any specific type of motor and hence the structure will be only generally referred to. It comprises a three part frame, including a base section 20, an intermediate section 21, and a top section 22. The top section 22 carries a cover 23 of bell form to protect the parts, constituting the motor, when exposed. The motor windings are shown as supported respectively in section 21 and on a rotatable sleeve 24. The stator windings 25 are approximately supported in laminations 26 in section 21; and the rotor includes the laminations 27 keyed to sleeve 24 as at 28.

In the present arrangement, shaft 10 is axially adjustable in sleeve 24 in which it is located, as by being threaded at its upper end. A nut 29 engages these threads and can be fastened to a member 30 as by a bolt 31. This member is keyed to shaft 10 and drives flange 33 by means of pins 32. This flange 33 is keyed to sleeve 24 and is held in place by means of clamp nuts 34.

The upper section 22 of the motor frame has a horizontal flange 35 provided with a central hub 36 that is concentric with and spaced from the sleeve 24. Supported on flange 35 is a ring support 37 for accommodating the outer stationary race 38 of a ball bearing 39. The inner race 40 is fastened on a depending ring 41 of flange 33.

In order to provide an oil well or reservoir for maintaining oil around the ball bearing 39, I secure a tube 42 into hub 36 and extending upwardly into a circular aperture 43 in ring 41 to a height about the level of the oil to be maintained in the reservoir. Thus oil can be supplied to a space or reservoir defined in general by the tube 42 and the wall 44 of the race support 37. An oil pipe 45 can be used to supply oil to the space, through appropriate passageways leading into the oil reservoir.

At the lower end of the motor 15, another ball bearing such as 46 can be provided. The stationary race 47 is supported in a tubular member 48 shown as formed integrally with the flange 49 that extends across the bottom frame section 20. The inner race 50 is fastened to the lower end 55 of an over-lying member 51. The member 51 is keyed to the sleeve 24 and overlies the upper edge of the member 48 so as to prevent any oil from spattering out.

In this instance, an oil space or reservoir is formed by the tubular member 48, a hub 52 integral with the flange 49, and the member 51. An oil inlet pipe 53 can be used to supply oil to this reservoir. In order to maintain the oil in the reservoir around the ball bearing 46, and to prevent the escape of the oil from the reservoir along the shaft 10, I provide a tube or sleeve 54 which extends into a space formed between the lower end 55 of the overlying member 51 and the shaft 10.

My device is so arranged that the rotation of shaft 10 will serve to secure a supply of oil by means of gravity into the top of casing 12, where it will distribute itself to the various bearing sleeves such as 11. I utilize gravity for this oil feed through the medium of a pipe connection 56 extending to the top of casing 12, and including a manually set regulating valve 57 for controlling the rate of flow when a conduit 58 is opened by action of the motor in a manner to be described. To produce the oil flow I utilize a valve structure within the oil reservoir, which is so arranged that no oil can pass to the conduit 56 from the reservoir, when the pump is not operating, but which is open for at least part of the time when the shaft 10 rotates. This valve structure is preferably such that centrifugal force imparted to a member 61, by virtue of the rotation of shaft 10 and its consequent rotation of the overlying member 51 and the lower portion 55 thereof, serves to open the passageway 58 to permit the passage of oil therethrough and thus establish communication between the reservoir and the conduit 56. Gravity causes this member to return to normal position as the motion of the shaft 10 ceases, and thus closes the passageway 58. This passageway extends through the tubular member 48.

This will be readily understood and made apparent from an inspection of Figs. 1 and 3.

Thus, I provide an oil valve structure comprising a conduit 59 which connects the needle valve 57 and the passageway 58. As has been heretofore pointed out, the passageway 58 extends through the tubular member 48 at a point adjacent the lower end of the oil reservoir. It is now apparent that a passageway exists between the oil reservoir and the valve 57 through the medium of conduit 59. This passageway is interrupted by means of a closure member or gate 60 which normally closes the passageway between the reservoir and the conduit 59.

The closure member or gate 60 is moved into and out of closing position by means of the centrifugal force applied to the member 61 in a manner now to be described.

To the lower end 55 of the rotatable overlying member 51 a ring member 62 is secured having an L-shaped cross-section. This member is provided with several diagonally positioned slots 63 extending outwardly to the top of the base of the L-shaped member. This slot is of such a size as to permit the ready egress and ingress of the member or projectile 61. As shown in Figures 1 and 3, this projectile is in the form of a ball, but it is to be understood that this invention is not limited thereto, as any other conveniently shaped member may be utilized as the projectile. The member 62 additionally serves as means for maintaining the inner race 50 in place.

Overlying the base of the member 62 and supported thereon is a flat ring or flange 64 having a slot or groove 65 in the under side thereof. This slot in its normal position, directly overlies slots 63. The closure member or gate 60 is screw-threaded into the member 64 and is movable therewith. Although but two closure members 60 are shown in the drawings, it is to be understood that any desired number of these closure members as is necessary may be secured to the member 64. However, it is also to be understood that the closure member 60 interrupting communication between the reservoir and the conduit 59, is the only one that really acts as a closure member, the others being merely guides or supports for the vertical movement of ring 64. Slot 65 is shallow, so that the ball 61 cannot leave the slot 63.

The operation of the device is readily apparent from the foregoing. While the pump is inactive, the closure member 60 interrupts the flow of oil to the casing 12. When the shaft 10 rotates, it causes a rotation of the member 51, and a consequent rotation of the member 62. As the rotation of the member 62 continues, the ball 61 is also moved in an orbital path around shaft 10, and it is urged by centrifugal force, radially outwardly. It is constrained lower, by the slanting hole 63, to move diagonally upward along the length of this hole. This movement of the ball or projectile 61 is interrupted by the vertically guided ring 64, which in turn is moved upwardly by means of the force of the ball acting on the under side thereof. This causes a consequent upward movement of the closure member 60 and thereby permits oil to flow from the reservoir to the regulating valve 57 and thence by means of gravity causes the oil to flow onto the bearings 11. When the shaft 10 ceases to rotate, the ball 62 falls back into the slot 63 by means of gravity and the member 64 returns to its normal position, as does also the valve closure member or gate 60. If for any reason, it is desired to interrupt the oil flow permanently, as when repairs or removal are needed, valve 57 can be manipulated to accomplish this result. Although I have described my device as attached to the lower reservoir, it might be with equal advantage attached to the upper one. This is readily apparent from an inspection of Figs. 2 and 4, wherein a modification of the device heretofore described, is set forth.

In the form of the invention shown in Figs. 2 and 4, the top frame section 66 carries a flange 67 forming the bottom of the well or reservoir. The outer wall of the well or reservoir, as before, can be formed by the support 68 of the stationary race 69, and by the tube 70 projecting into the space between the shaft 10 and the depending flange 71 of the rotating ball race support 73. A nut 73', holding the rotating race 72 in place, is utilized to support a member 74 which acts to establish communication between the reservoir and the conduit 75, and in turn to a manually operated valve 76, in a manner to be now described.

The passageway between the reservoir and the needle valve 76 is interrupted by means of a circular member 77 having depending projecting pins, one of which acts as a valve closure member 78. The other pins 78', of which there may be any desired number act as guides or supports for the circular ring 77. The closure member 78 and the guides 78' are each accommodated in an aperture 80 formed in the top of the flange member 67 and which lead into the oil reservoir. A passageway 81 establishes communication between an aperture 80 and the conduit 75. A slot 79 is formed in the closure member 78 and is normally maintained above the passageway 81 by means of springs 82 which act against the top of the flange member 67 and onto the under side of the circular member 77. Springs 82' similar to the spring 82 surround each of the other guide members 78' and in this manner can maintain the ring 77 in a position shown in Figs. 2 and 4. To establish communication between the reservoir and the conduit 75, it is merely necessary to depress the circular ring 77 and its depending closure member 78 into the aperture 80 until the slot 79 is opposite the passageway 81.

This is accomplished by means of the several ball members 74. Each of these ball members 74 is screw-threaded onto one end of a corresponding lever 83, and the other end of the lever is swiveled to the lower end of the nut 73' as at 84. The ball 74 is normally maintained in a resting position on the top of circular member 77 by means of the spring 85.

The operation of this device is now readily apparent from the foregoing. When the shaft 10 rotates, it causes a consequent rotation of the member 71 and the nut 73'. This in turn causes a rotation of the ball members 74 over the top of the circular ring 77. As the rotation of the ball member 74 is continued, a centrifugal force is set up thereon which urges them outwardly, but as they are secured at one end, as by the swivel 84, the force is diverted downwardly against the action of the springs 82 and 85, and in this manner they depress the closure member 78 to establish communication as heretofore set out. When the rotation of the shaft 10 ceases, the springs 82 and 85 act to restore the parts to their normal position.

I claim:

1. In a device for supplying lubricant to bearings from a reservoir associated with a rotatable shaft and above the bearings, a conduit for the lubricant leading downwardly from the reservoir, a valve closure and means rotated by said shaft, said means comprising a member having a slot therein, leading radially outwardly, a part of the valve closure overlying said slot, and a member in said slot, whereby a rotation of said means causes the second named member to move out of the slot by centrifugal force and act against the valve closure to open it and thereby establish communication between the reservoir and the conduit.

2. In a device for supplying lubricant to bearings from a reservoir associated with a rotatable shaft and above the bearings, a conduit for the lubricant leading downwardly from the reservoir, a valve closure, and means rotated by said shaft, said means comprising a member having a diagonally positioned slot leading radially outwardly in one side thereof, and a projectile in said slot, a part of said valve closure overlying said slot, whereby a rotation of said means causes the projectile to move in the slot by centrifugal force and act on the valve closure to open it to establish communication between the reservoir and the conduit.

3. In a device for supplying lubricant to bearings from a reservoir associated with a rotatable shaft and above the bearings, a conduit for the lubricant leading downwardly from the reservoir, a valve closure, and means rotated by said shaft; said valve closure comprising a member overlying said means, said means comprising a member having a diagonally positioned slot leading radially outwardly in one side thereof, and a projectile in said slot; whereby a rotation of said means causes the projectile to move in the slot and act against said first named member to lift the valve closure and thereby establish communication between the reservoir and the conduit.

4. The combination set out in claim 3 in which the projectile consists of a ball.

5. The combination set out in claim 3 in which said first named member has a slot in the underside thereof which overlies the slot in the rotated means.

6. The combination set out in claim 3 in which the projectile is characterized by an arrangement whereby it will return to the bottom of the slot when the rotation of the means is stopped, and thus cause the communication between reservoir and conduit to be broken.

7. In a device for supplying lubricant to bearings from a reservoir associated with a rotatable shaft and above the bearings, a conduit for the lubricant leading downwardly from the reservoir, a valve closure, and means rotated by said shaft, said means during rotation thereof, acting on the valve closure to depress it and thereby establish communication between the reservoir and the conduit.

8. In a device for supplying lubricant to bearings from a reservoir associated with a rotatable shaft and above the bearings, a conduit for the lubricant leading downwardly from the reservoir, a valve closure, and means rotated by said shaft, said means acting, in response to rotation thereof, to exert a downward force on the closure member and thereby establish communication between the reservoir and the conduit.

9. In a device for supplying lubricant to bearings from a reservoir associated with a rotatable shaft and above the bearings, a conduit for the lubricant leading downwardly from the reservoir, a valve closure, and means rotated by said shaft, said means comprising a member carried by the shaft and adapted to rest on the closure member, and said means acting in response to rotation thereof, to exert a downward force on the closure member and thereby establish communication between the reservoir and the conduit.

10. The combination set out in claim 9, with means to restore said means rotated by said shaft to normal position when the rotation of the shaft ceases.

11. The combination set out in claim 9 in which the closure member comprises a circular ring having a depending pin, and in which the pin is provided with a slot, whereby communication between the reservoir and the conduit is established when the closure member is depressed.

12. The combination set out in claim 9, with means to restore said closure member to normal position, said means being incapable of restoring the closure member to normal position during rotation of the shaft.

13. In a device for supplying lubricant to a bearing from a reservoir associated with a rotatable shaft and above the bearing, a stationary conduit leading from the reservoir to the bearing, and means controlling the passageway through the conduit, comprising a member separate from said lubricant and operated by centrifugal force when the shaft rotates, said member including a device acting mechanically to interrupt communication between the reservoir and the conduit in response to the stopping of the rotation of the shaft.

14. In a device for supplying lubricant to a bearing from a reservoir associated with a rotatable shaft and above the bearing, a stationary conduit leading from the reservoir to the bearing, and means controlling the passageway through the conduit, comprising a member separate from said lubricant and operated by centrifugal force when the shaft rotates, and a closure member mechanically acted on by said member, to open it during rotation of the shaft, said closure member including a device acting mechanically to interrupt communication between the reservoir and the conduit in response to the stopping of the rotation of the shaft.

15. In a device for supplying lubricant to bearings from a reservoir associated with a rotatable shaft and above the bearings, a stationary conduit for the lubricant leading downwardly from the reservoir to the bearings, a valve closure and means separate from said lubricant and acting by centrifugal force on the valve closure to establish communication between the reservoir and the conduit, said means including a device acting mechanically to interrupt communication between the reservoir and the conduit in response to the stopping of the rotation of the shaft.

16. In a device for supplying lubricant to bearings from a reservoir associated with a rotatable shaft and above the bearings, a stationary conduit for the lubricant leading downwardly from the reservoir to the bearings, a valve closure interposed between the conduit and the reservoir, and means separate from said lubricant and acting by centrifugal force on the valve closure to establish communication between the reservoir and the conduit, said means including a device acting mechanically to interrupt communication between the reservoir and the conduit in response to the stopping of the rotation of the shaft.

17. In a device for supplying lubricant to bearings from a reservoir associated with a rotatable shaft and above the bearings, a stationary conduit for the lubricant leading downwardly from the reservoir to the bearings, a valve closure, and means separate from said lubricant and rotated by said shaft, said means, actuated by centrifugal force during rotation thereof, acting on the valve closure to establish communication between the reservoir and the conduit, said means including a device acting mechanically to interrupt communication between the reservoir and the conduit in response to the stopping of the rotation of the shaft.

18. In a device for supplying lubricant to bearings from a reservoir associated with a rotatable shaft and above the bearings, a conduit for the lubricant leading downwardly from the reservoir, a valve closure and means rotated by said shaft, said means comprising a member having a slot therein, leading radially outwardly, and a member in said slot, a part of said valve closure overlying said slot, whereby a rotation of said means causes the second named member by centrifugal force to move out of the slot and act against the valve closure and thereby establish communication between the reservoir and the conduit.

19. In a device for supplying lubricant to bearings from a reservoir associated with a rotatable shaft and above the bearings, a conduit for the lubricant leading downwardly from the reservoir, a valve closure, and means rotated by said shaft; said valve closure comprising a member overlying said means, said means comprising a member having a diagonally positioned slot leading radially outwardly in one side thereof, and a projectile in said slot, whereby a rotation of said means causes the projectile by centrifugal force to move in the slot and act against said first named member to lift the valve closure and thereby establish communication between the reservoir and the conduit.

20. In a device for supplying lubricant to bearings from a reservoir associated with a rotatable shaft and above the bearings, a conduit for the lubricant leading downwardly from the reservoir, a valve closure, and means rotated by said shaft, said means during rotation thereof, acting by centrifugal force on the valve closure to depress it and thereby establish communication between the reservoir and the conduit.

21. In a device for supplying lubricant to bearings from a reservoir associated with a rotatable shaft and above the bearings, a conduit for the lubricant leading downwardly from the reservoir, a valve closure, and means rotated by said shaft, said means comprising a shaft having a member adapted to rest on the closure member, and said means acting through centrifugal force in response to rotation thereof, to exert a downward force on the closure member and thereby establish communication between the reservoir and the conduit.

THOMAS G. MYERS.